(12) United States Patent
Shao

(10) Patent No.: US 11,792,488 B2
(45) Date of Patent: Oct. 17, 2023

(54) ELECTRONIC DEVICE, METHOD, MEDIUM, AND PROGRAM FOR SIMULTANEOUS INTERPRETATION

(71) Applicant: ARRIS Enterprises LLC, Suwanee, GA (US)

(72) Inventor: Yongbo Shao, Shanghai (CN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/666,995

(22) Filed: Feb. 8, 2022

(65) Prior Publication Data

US 2022/0256248 A1   Aug. 11, 2022

(30) Foreign Application Priority Data

Feb. 9, 2021   (CN) .......................... 202110179590.9

(51) Int. Cl.
```
H04N 21/485      (2011.01)
G06F 40/58       (2020.01)
H04N 21/439      (2011.01)
H04N 21/45       (2011.01)
H04N 21/488      (2011.01)
```
(52) U.S. Cl.
CPC ......... *H04N 21/4856* (2013.01); *G06F 40/58* (2020.01); *H04N 21/439* (2013.01); *H04N 21/4524* (2013.01); *H04N 21/4882* (2013.01)

(58) Field of Classification Search
None
See application file for complete search history.

(56) References Cited

U.S. PATENT DOCUMENTS

2012/0035907 A1   2/2012 Lebeau et al.
2018/0376218 A1*  12/2018 Wu ..................... H04N 21/4183
(Continued)

FOREIGN PATENT DOCUMENTS

CN   105912532   11/2020

OTHER PUBLICATIONS

International Search Report and the Written Opinion of the International Searching Authority dated Jun. 22, 2022 in International Application No. PCT/US2022/0156613.
(Continued)

*Primary Examiner* — Omar S Parra
(74) *Attorney, Agent, or Firm* — Wenderoth, Lind & Ponack, L.L.P.

(57) ABSTRACT

The present disclosure relates to an electronic device, a method, a medium, and a program for simultaneous interpretation. An electronic device includes: a memory storing instruction; and a processor configured to execute the instruction to cause the electronic device to: present a prompt on a user interface indicating whether simultaneous interpretation is required when the language of a video or program is not the official language of the geographic location; present target language options to the user in response to selection of simultaneous interpretation, wherein the target language options include the official language; receive the original audio of the video or program; extract the audio segments of the original audio in real time and translate them into a target language in response to the selection of the target language; and output the audio segments in the target language.

20 Claims, 4 Drawing Sheets

(56) References Cited

U.S. PATENT DOCUMENTS

2019/0364303 A1* 11/2019 Zhu .................... H04N 21/2368
2020/0007946 A1* 1/2020 Olkha ................... G06F 40/263
2020/0314460 A1* 10/2020 Hu ...................... H04N 21/4307
2021/0073526 A1* 3/2021 Zeng .................... G06V 40/176

OTHER PUBLICATIONS

Chen Xiaomin et al: "Sequence-to-sequence Modelling for Categorical Speech Emotion Recognition Using Recurrent Neural Network", A 2018 First Asian Conference on Affective Computing and Intelligent Interaction (ACII Asia), IEEE, May 20, 2018 (May 20, 2018), pp. 1-6, XP033407015.

International Preliminary Report on Patentability dated Aug. 15, 2023 in corresponding International (PCT) Application No. PCT/US2022/015613.

* cited by examiner

ELECTRONIC DEVICE, METHOD, MEDIUM, AND PROGRAM FOR SIMULTANEOUS INTERPRETATION

TECHNICAL FIELD

The present disclosure relates to the field of electronic devices, and in particular to an electronic device, a method, a medium, and a program for simultaneous interpretation.

BACKGROUND ART

With the popularization of television and the Internet, we can enjoy a variety of videos and programs from all over the world, such as movies, TV series, variety shows, and various kinds of short videos, from the comfort of our homes. However, for most people, not being able to understand foreign languages is an obstacle that hinders the appreciation of foreign language programs or videos.

Some TV shows or movies have dubbing or subtitles, but most variety shows, web dramas or short videos do not have dubbing or subtitles. Moreover, even if subtitles are available, it is difficult for uneducated or lowly-educated people to understand the plots because they cannot understand the subtitles.

Therefore, it is necessary that an electronic device for simultaneous interpretation can be provided to users who do not understand foreign languages.

SUMMARY OF THE INVENTION

The present disclosure provides an electronic device, a method, a medium, and a program for simultaneous interpretation through an AI (Artificial Intelligence) service module, so that users can enjoy good programs or videos from all over the world at any time without language barriers, thereby enhancing user experience.

Some aspects of the present disclosure relate to an electronic device, which includes: a memory having an instruction stored thereon; and a processor configured to execute the instruction stored on the memory to cause the electronic device to carry out the following operations: presenting a user with a prompt on whether simultaneous interpretation is required through a user interface when it is detected that the language of a video or program is not the official language of the geographic location; presenting target language options to the user in response to the user's selection of the need for simultaneous interpretation, wherein the target language options include the official language; receiving the original audio of the video or program; extracting the audio segments of the original audio in real time and translating them into the target language in response to the user's selection of the target language; and outputting the audio segments in the target language.

In some embodiments, the processor is further configured to execute an instruction stored on the memory to cause the electronic device to carry out the following operation: commenting out the original audio from the video or program when it is received, to disable it.

In some embodiments, the processor is further configured to execute an instruction stored on the memory to cause the electronic device to carry out the following operations before outputting the audio segments in the target language: encoding the extracted audio segments to obtain the encoded data; use the IEMOCAP dataset to assign the encoded data to four emotion categories, and conducting data training on each of these four emotion categories to establish a double-loop neural network model, wherein the four emotion categories include anger, happiness, sadness and neutrality; and applying the double-loop neural network model to the audio segments of the target language.

In some embodiments, the processor is further configured to execute an instruction stored on the memory to cause the electronic device to carry out the following operation: identifying the geographic location of the user to obtain the official language of the geographic location.

In some embodiments, the processor is further configured to execute an instruction stored on the memory to cause the electronic device to carry out the following operation: presenting the user with a prompt on whether simultaneous interpretation is required through the user interface of a terminal device when it is detected that the language of the video or program watched by the user through the terminal device is not the official language of the geographic location.

In some embodiments, the processor is further configured to execute an instruction stored on the memory to cause the electronic device to carry out the following operation: receiving the original audio of the video or program from the terminal device.

In some embodiments, the processor is further configured to execute an instruction stored on the memory to cause the electronic device to carry out the following operation: sending the audio segments in the target language to the terminal device.

In some embodiments, the terminal device is a set-top box.

In some embodiments, the electronic device is pluggable.

Other aspects of the present disclosure relate to a simultaneous interpretation method realized by an electronic device, which includes: presenting a user with a prompt on whether simultaneous interpretation is required through a user interface when it is detected that the language of a video or program is not the official language of the geographic location; presenting target language options to the user in response to the user's selection of the need for simultaneous interpretation, wherein the target language options include the official language; receiving the original audio of the video or program; extracting the audio segments of the original audio in real time and translate them into the target language in response to the user's selection of the target language; and outputting the audio segments in the target language.

In some embodiments, the method further includes: commenting out the original audio from the video or program when it is received, to disable it.

In some embodiments, the method further includes performing the following operations before outputting the audio segments in the target language: encoding the extracted audio segments to obtain the encoded data; using the IEMOCAP dataset to assign the encoded data to four emotion categories, and conducting data training on each of these four emotion categories to establish a double-loop neural network model, wherein the four emotion categories include anger, happiness, sadness and neutrality; and applying the double-loop neural network model to the audio segments of the target language.

In some embodiments, the method further includes identifying the geographic location of the user to obtain the official language of the geographic location.

In some embodiments, presenting a user with a prompt on whether simultaneous interpretation is required through a user interface when it is detected that the language of a video or program is not the official language of the geographic location includes: presenting the user with a prompt on whether simultaneous interpretation is required through the user interface of a terminal device when it is detected that the language of the video or program watched by the user through the terminal device is not the official language of the geographic location.

In some embodiments, receiving the original audio of the video or program includes: receive the original audio of the video or program from the terminal device.

In some embodiments, outputting the audio segments in the target language includes: sending the audio segments in the target language to the terminal device.

In some embodiments, the terminal device is a set-top box.

In some embodiments, the electronic device is pluggable.

Other aspects of the present disclosure relate to a non-transitory computer-readable medium which has an instruction stored thereon to be executed by a processor so as to execute a step of the method described above.

Other aspects of the present disclosure relate to a computer program product including a computer program, when executed by a processor, the computer program executing a step of the method described above.

BRIEF DESCRIPTION OF THE ATTACHED DRAWINGS

For a better understanding of the present disclosure and to show how to implement the present disclosure, examples are herein described with reference to the attached drawings, wherein.

It should be noted that throughout the attached drawings, similar reference numerals and signs refer to corresponding parts.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is defined by the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

Figure 1:
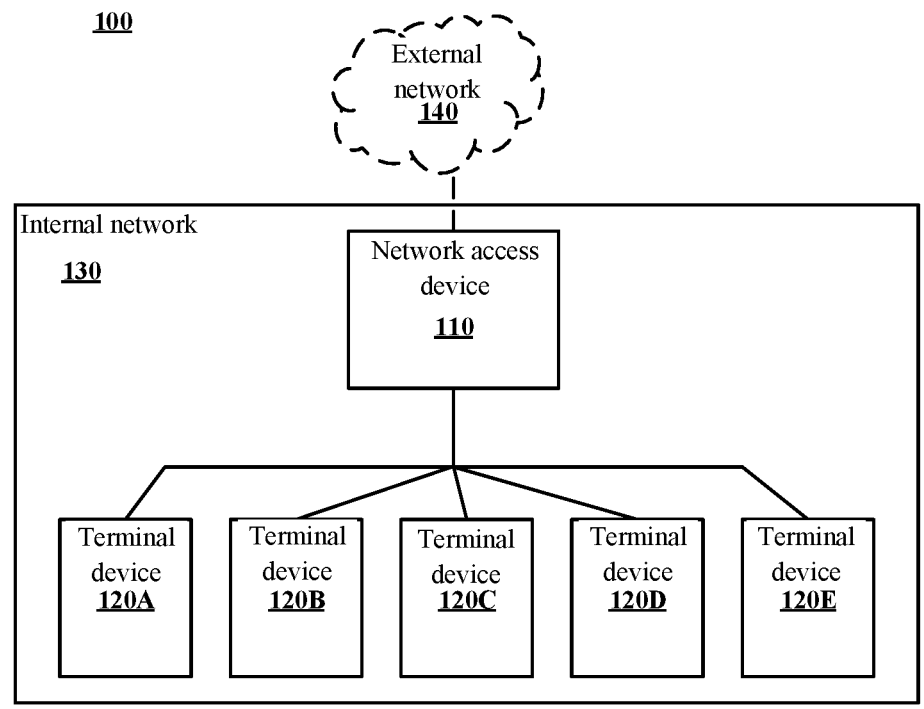
FIG. 1 is a schematic diagram showing an example network environment including a network access device according to an embodiment of the present disclosure.

FIG. 1 is a schematic diagram showing an example network environment 100 including a network access device according to an embodiment of the present disclosure.

The example network environment 100 may include a network access device 110 and one or more terminal devices 120A, 120B, 120C, 120D, and 120E (hereinafter collectively referred to as terminal device 120 for convenience). The network access device 110 is used to provide a network connection for the terminal device 120. Specifically, the network access device 110 may receive/route various types of communications from the terminal device 120 and/or transmit/route various types of communications to the terminal device 120. In some embodiments, the network access device 110 only provides an internal network 130 (for example, wired or wireless local area network (LAN)) connection for the terminal device 120, and all terminal devices 120 connected to the network access device 110 are in the same internal network and can directly communicate with each other. In a further embodiment, the network access device 110 is further connected to an external network 140, via which, the terminal device 120 can access the external network 140. The network access device 110 may be, for example, a hardware electronic device which combines the functions of a network access server (NAS), a modem, a router, a layer 2/layer 3 switch, an access point, etc. The network access device 110 may further include, but is not limited to, a function of an IP/QAM set top box (STB) or a smart media device (SMD), and the IP/QAM set top box (STB) or the smart media device (SMD) can decode audio/video content and play content provided by an Over The Top (OTT) provider or a Multi-Systems Operator (MSO).

In some embodiments, the terminal device 120 may be any electronic device having at least one network interface. For example, the terminal device 120 may be: a desktop computer, a laptop computer, a server, a mainframe computer, a cloud-based computer, a tablet computer, a smart phone, a smart watch, a wearable device, a consumer electronic device, a portable computing device, a radio node, a router, a switch, a repeater, an access point and/or other electronic devices. As described in detail below with reference to FIG. 2, the terminal device 120 communicates with a physical or virtual network interface of the network access device 110 using its network interface, thereby accessing the internal network 130 via the network access device 110. A plurality of terminal devices 120A, 120B, 120C, 120D, and 120E may be connected to the same or different network interfaces of the network access device 110. Although five terminal devices are shown in FIG. 1, it should be understood that the number of terminal devices that can be connected to the network access device may be less than or more than five, depending on the number of specific physical interfaces and/or network capacity supported by the network access device.

The external network 140 may include various types of wired or wireless networks, internal networks or public networks, for example, other local area networks or wide area networks (WAN) (such as the Internet). It should be noted that the present disclosure does not specifically define the type of the external network 140.

Figure 2:
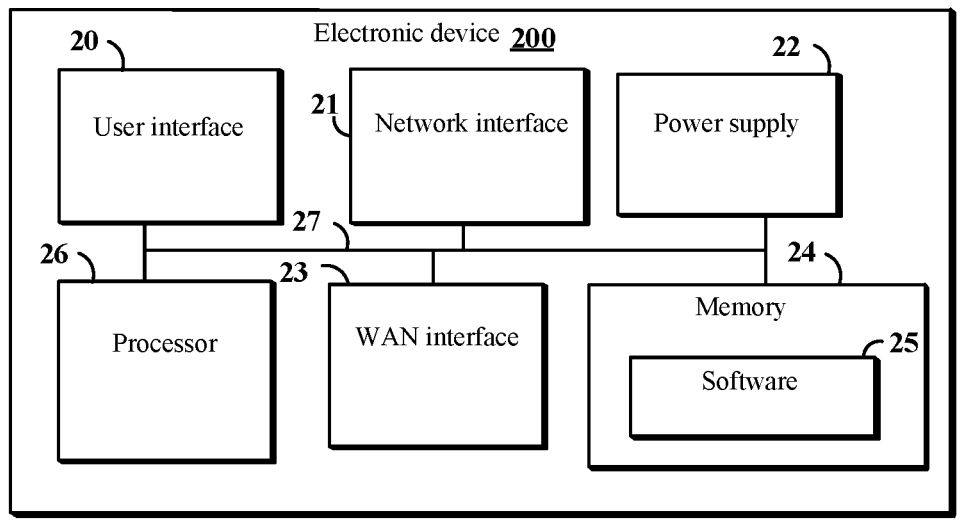
FIG. 2 shows a block diagram of an electronic device for realizing simultaneous interpretation according to an embodiment of the present disclosure.

FIG. 2 is a block diagram showing an exemplary configuration of an electronic device 200 for realizing simultaneous interpretation according to an embodiment of the present disclosure.

As shown in FIG. 2, the electronic device 200 includes a user interface 20, a network interface 21, a power supply 22, an external network interface 23, a memory 24, and a processor 26. The user interface 20 may include, but is not limited to, a button, a keyboard, a keypad, LCD, CRT, TFT, LED, HD or other similar display devices, including a display device with a touch screen capability that enables interaction between a user and a gateway device. In some embodiments, the user interface 20 may be used to present a graphical user interface (GUI) to receive user input.

The network interface 21 may include various network cards and a circuit system enabled by software and/or hardware so as to be able to communicate with a user device using wired or wireless protocols. The wired communication protocol is, for example, any one or more of the Ethernet protocol, the MoCA specification protocol, the USB protocol, or other wired communication protocols. The wireless protocol is, for example, any IEEE 802.11 Wi-Fi protocol, Bluetooth protocol, Bluetooth Low Energy (BLE) or other short-distance protocols operated in accordance with wireless technology standards, and is used for utilization of any licensed or unlicensed frequency band (for example, the Citizen Broadband Radio Service (CBRS) band, 2.4 GHz band, 5 GHz band, 6 GHz band, or 60 GHz band), RF4CE protocol, ZigBee protocol, Z-Wave protocol, or IEEE 802.15.4 protocol to exchange data over a short distance. When the network interface 21 uses a wireless protocol, in some embodiments, the network interface 21 may further include one or more antennas (not shown) or a circuit node to be coupled to one or more antennas. The electronic device 200 may provide an internal network (for example, the internal network 130 in FIG. 1) to the user device through the network interface 21.

The power supply 22 provides power to internal components of the electronic device 200 through an internal bus 27. The power supply 22 may be a self-contained power supply such as a battery pack, the interface of which is powered by (for example, directly or through other devices) a charger connected to a socket. The power supply 22 may further include a rechargeable battery that is detachable for replacement, for example, NiCd, NiMH, Li-ion, or Li-pol battery. The external network interface 23 may include various network cards and a circuit system enabled by software and/or hardware so as to achieve communication between the electronic device 200 and a provider (for example, an Internet service provider or a multi-system operator (MSO)) of an external network (for example, the external network 140 in FIG. 1).

The memory 24 includes a single memory or one or more memories or storage locations, including but not limited to a random access memory (RAM), a dynamic random access memory (DRAM), a static random access memory (SRAM), a read-only memory (ROM), EPROM, EEPROM, a flash memory, FPGA logic block, a hard disk, or any other layers of a memory hierarchy. The memory 24 may be used to store any type of instructions, software or algorithms, including software 25 for controlling general functions and operations of the electronic device 200.

The processor 26 controls general operations of the electronic device 200 and executes management functions related to other devices (such as a user device) in the network. The processor 26 may include, but is not limited to, a CPU, a hardware microprocessor, a hardware processor, a multi-core processor, a single-core processor, a microcontroller, an application-specific integrated circuit (ASIC), a DSP, or other similar processing devices, which can execute any type of instructions, algorithms, or software for controlling the operations and functions of the electronic device 200 according to the embodiments described in the present disclosure. The processor 26 may be various realizations of a digital circuit system, an analog circuit system, or a mixed signal (combination of analog and digital) circuit system that executes functions in a computing system. The processor 26 may include, for example, an integrated circuit (IC), a part or circuit of a separate processor core, an entire processor core, a separate processor, a programmable hardware device such as a field programmable gate array (FPGA), and/or a system including a plurality of processors.

The internal bus 27 may be used to establish communication between the components of the electronic device 200 (for example, 20 to 22, 24 and 26).

Although specific components are used to describe the electronic device 200, in an alternative embodiment, there may be different components in the electronic device 200. For example, the electronic device 200 may include one or more additional controllers, memories, network interfaces, external network interfaces and/or user interfaces. In addition, one or more of the components may not exist in the electronic device 200. Moreover, in some embodiments, the electronic device 200 may include one or more components not shown in FIG. 2. In addition, although separate components are shown in FIG. 2, in some embodiments, some or all of the given components may be integrated into one or more of the other components in the electronic device 200. Moreover, any combination of analog and/or digital circuits may be used to realize the circuit and components in the electronic device 200.

Figure 3:
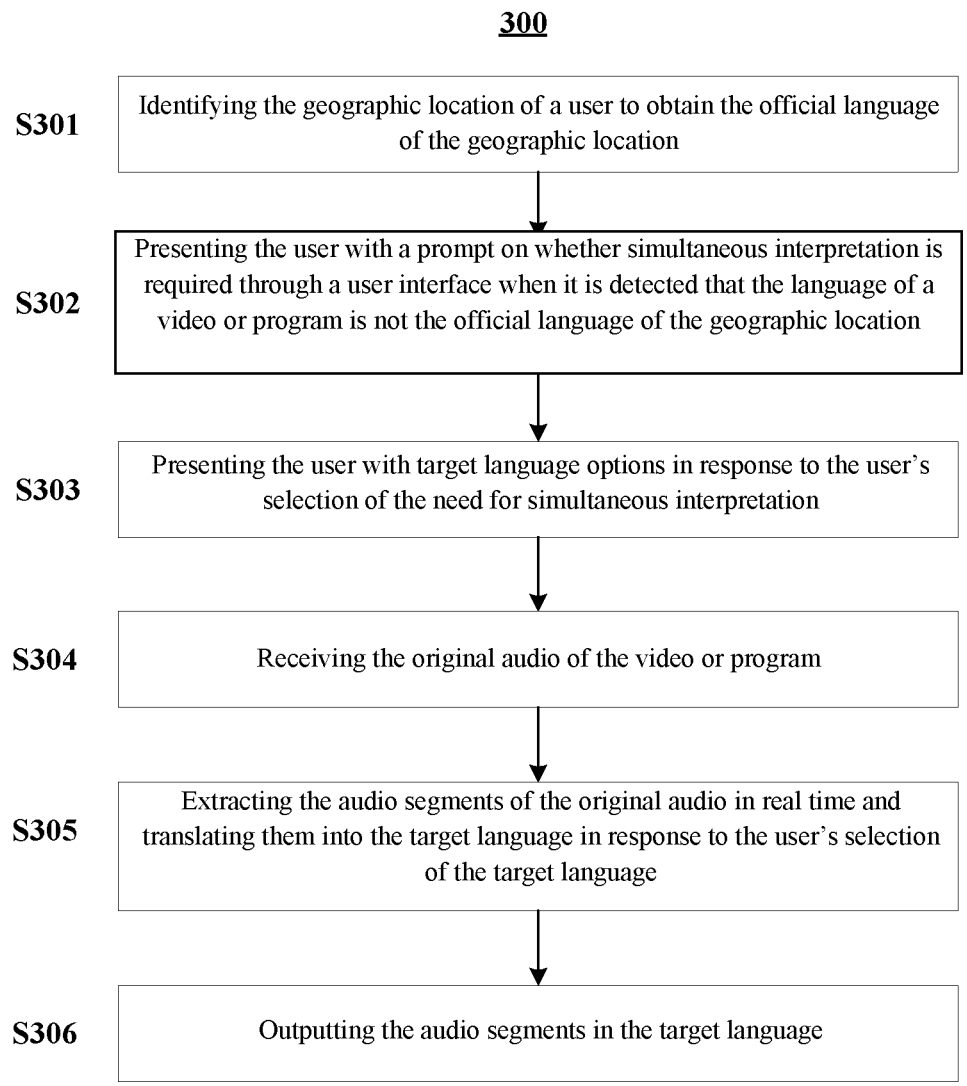
FIG. 3 shows a flowchart of an exemplary method for realizing simultaneous interpretation according to an embodiment of the present disclosure.
Figure 4:
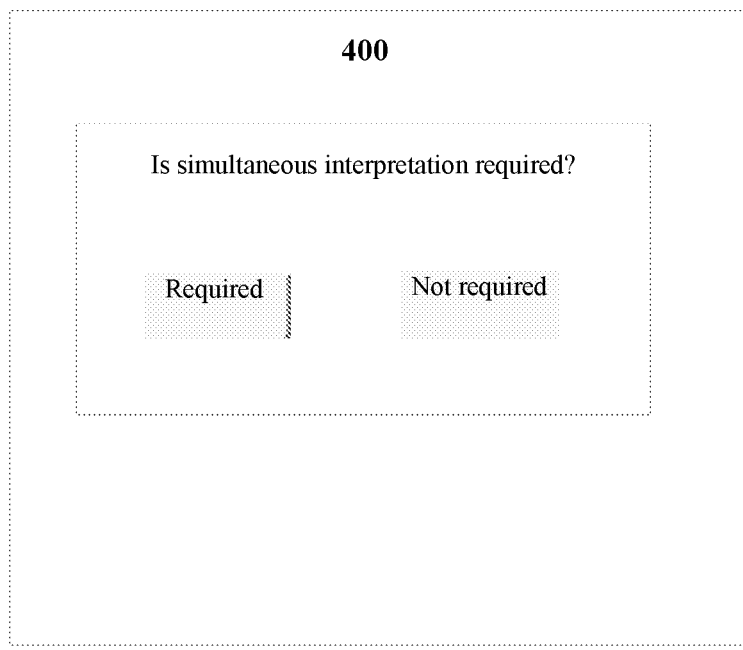
FIG. 4 and FIG. 5 show exemplary user interfaces for simultaneous interpretation according to an embodiment of the present disclosure.
Figure 5:
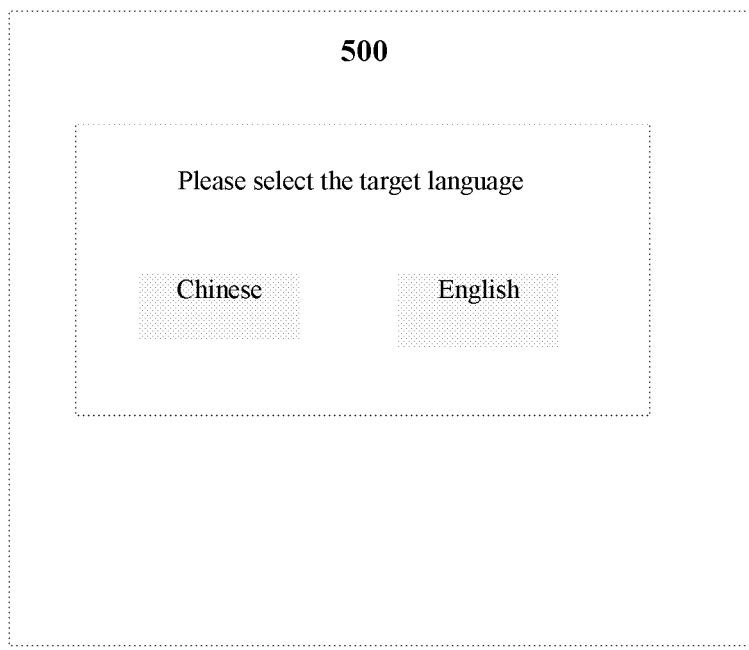

FIG. 3 shows a flowchart of an exemplary method 300 for realizing simultaneous interpretation according to an embodiment of the present disclosure. The method 300 may be executed, for example, by the electronic device 200 shown in FIG. 2. FIGS. 4 and 5 show exemplary user interfaces 400 and 500 for simultaneous interpretation according to an embodiment of the present disclosure. The electronic device and the method used for the electronic device according to embodiments of the present disclosure will be described in detail below with reference to FIG. 1 to FIG. 3 and FIGS. 4 and 5.

As shown in FIG. 3, at step S301, identifying the geographic location of a user to obtain the official language of the geographic location. For example, if the geographic location of the user is identified as Wuhan, the official language is Chinese. According to an embodiment of the present disclosure, the function of identifying the user's geographic location may be provided by an AI service module, and the AI service module may be realized by the processor 26 in FIG. 2. The AI service module can intelligently analyze user portraits, including the user's geographic location.

At step S302, when it is detected that the language of a video or program is not the official language of the geographic location, presenting the user with a prompt on whether simultaneous interpretation is required through a user interface. For example, when it is detected that the language of the video or program watched by the user through a terminal device is not the official language of the geographic location, presenting the user with a prompt on whether simultaneous interpretation is required through the user interface of the terminal device. The terminal device may be a TV set or a computer. Taking the terminal device as a TV set as an example, when it is detected that the language of the video watched by the user (for example, a movie played by CCTV6) is Russian, and the location of the user is Wuhan, the user is presented with a prompt on whether simultaneous interpretation is required through the TV. It should be noted that when the terminal device is a TV set, the terminal device is actually a set-top box, and the TV set only serves as a user interface of the set-top box.

FIG. 4 shows a schematic diagram of a user interface (for example, a TV set) of a terminal device (for example, a set-top box) presenting the user with a prompt on whether simultaneous interpretation is required.

At step S303, in response to the user's selection of the need for simultaneous interpretation, the user is presented with target language options. The target language options include the official language. For example, in a case where the movie watched by the user is in Russian and the user is identified as being in Wuhan, the target language options may be Chinese, and one or more of languages including Japanese, Korean, and English.

Referring to FIG. 4, if the user selects "not required", the user may continue enjoying the original program or video. If the user selects "required", the graphical user interface shown in FIG. 5 is presented to the user in response to the user's selection of the "required" button (for example, clicking via the remote control).

FIG. 5 shows a schematic diagram of a user interface (for example, a TV set) of a terminal device (for example, a set-top box) presenting target language options to the user. It should be understood that the "Chinese" and "English" given here are only examples. When the user is in a different geographic location (for example, a different country), the target language options are different, and there can be at least two languages. However, in order to improve the user experience, the target language options include the official language of the location.

At step S304, receiving the original audio of the video or program. For example, receiving the original audio of the video or program from the terminal device. According to the embodiment of the present disclosure, when the user selects the option that simultaneous interpretation is required, the AI service provided by the processor 26 as shown in FIG. 2 will be triggered; on the one hand, the original audio of the video or program is received from the terminal device (for example, a set-top box); on the other hand, the original audio is commented out from the video or program to disable it, so that the user will not hear the original audio of the program or video, thereby avoiding confusion caused to the user by the original audio and simultaneous interpretation occurring at the same time.

At step S305, in response to the user's selection of the target language, extracting the audio segments of the original audio in real time and translating them into the target language. The existing audio analysis and translation methods may be used for the analysis of the original audio segments and their translation into the target language, which will not be repeated here.

At step S306, outputting the audio segments in the target language. For example, sending the audio segments in the target language to the terminal device. The terminal device (for example, a set-top box) can then play the video or program that the user is watching in the target language selected by the user. Due to the fast analytical processing speed of the AI service, the user can hardly feel the delay between the audio playback and the original video or program.

In order to further enhance the user experience, the AI service proposed by the present disclosure can further extract the emotions of each character or role in the video or program, and restore the emotions of each character or role before sending the audio segments in the target language to the terminal device.

According to an exemplary embodiment of the present disclosure, the AI service module can encode the extracted audio segments to obtain the encoded data, and use the IEMOCAP dataset to assign the encoded data to, for example, four emotion categories; data training is then performed on each of these four emotion categories to establish a double-loop neural network model; and finally, the double-loop neural network model is applied to the audio segments of the target language, to obtain a complete translated audio to be sent back to the program or video. According to a preferred embodiment, the four emotion categories include anger, happiness, sadness and neutrality.

According to an embodiment of the present disclosure, the electronic device used to execute the simultaneous interpretation method shown in FIG. 3 can be either a built-in module, such as a smart module built in a set-top box, or a pluggable hardware, which is convenient for users who require simultaneous interpretation to carry around, and can be applied to both set-top boxes as well as computers and other terminal devices with operating systems.

Through the above-mentioned electronic device for simultaneous interpretation, simultaneous interpretation can be provided for users with language limitations when enjoying videos or programs in foreign languages, thereby enhancing user experience. By designing the above-mentioned electronic device for simultaneous interpretation as a pluggable type, it is convenient for users to apply one simultaneous interpretation device to a variety of terminal devices, and it is also convenient for users to carry it around, thereby improving device utilization and further enhancing user experience.

The present disclosure may be realized as any combination of devices, systems, integrated circuits, and computer programs on non-transitory computer-readable media. One or more processors may be realized as an integrated circuit (IC), an application specific integrated circuit (ASIC) or a large-scale integrated circuit (LSI), a system LSI, a super LSI, or an ultra LSI component that performs part or all of the functions described in the present disclosure.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or more memories store software or algorithm with executable instructions, and one or more processors can associate with a set of instructions for executing the software or algorithm so as to provide network configuration information management functions of network access devices according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable programmable read-only memory (EE- PROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

The invention claimed is:

1. An electronic device, including:
a memory having an instruction stored thereon; and
a processor configured to execute the instruction stored on the memory to cause the electronic device to carry out the following operations:
  presenting a user with a prompt on whether simultaneous interpretation is required through a user interface when it is detected that the language of a video or program is not the official language of the geographic location;
  presenting target language options to the user in response to the user's selection of the need for simultaneous interpretation, wherein the target language options include the official language;
  receiving the original audio of the video or program;
  extracting the audio segments of the original audio in real time and translating them into the target language in response to the user's selection of the target language; and
  outputting the audio segments in the target language.

2. The electronic device according to claim 1, wherein the processor is further configured to execute an instruction stored on the memory to cause the electronic device to carry out the following operation:
  commenting out the original audio from the video or program when it is received, to disable it.

3. The electronic device according to claim 1, wherein the processor is further configured to execute an instruction stored on the memory to cause the electronic device to carry out the following operations before outputting the audio segments in the target language:
  encoding the extracted audio segments to obtain the encoded data;
  using the IEMOCAP dataset to assign the encoded data to four emotion categories, and conducting data training on each of these four emotion categories to establish a double-loop neural network model, wherein the four emotion categories include anger, happiness, sadness and neutrality; and
  applying the double-loop neural network model to the audio segments of the target language.

4. The electronic device according to claim 1, wherein the processor is further configured to execute an instruction stored on the memory to cause the electronic device to carry out the following operation:
  identifying the geographic location of the user to obtain the official language of the geographic location.

5. The electronic device according to claim 1, wherein the processor is further configured to execute an instruction stored on the memory to cause the electronic device to carry out the following operation:
  present the user with a prompt on whether simultaneous interpretation is required through the user interface of a terminal device when it is detected that the language of the video or program watched by the user through the terminal device is not the official language of the geographic location.

6. The electronic device according to claim 5, wherein the processor is further configured to execute an instruction stored on the memory to cause the electronic device to carry out the following operation:
  receive the original audio of the video or program from the terminal device.

7. The electronic device according to claim 6, wherein the processor is further configured to execute an instruction stored on the memory to cause the electronic device to carry out the following operation:
  send the audio segments in the target language to the terminal device.

8. The electronic device according to claim 5, wherein the terminal device is a set-top box.

9. The electronic device according to claim 1, wherein the electronic device is pluggable.

10. A simultaneous interpretation method realized by the electronic device, which includes:
  presenting a user with a prompt on whether simultaneous interpretation is required through a user interface when it is detected that the language of a video or program is not the official language of the geographic location;
  presenting target language options to the user in response to the user's selection of the need for simultaneous interpretation, wherein the target language options include the official language;
  receiving the original audio of the video or program;
  extracting the audio segments of the original audio in real time and translating them into the target language in response to the user's selection of the target language; and
  outputting the audio segments in the target language.

11. The simultaneous interpretation method according to claim 10 further includes:
  commenting out the original audio from the video or program when it is received, to disable it.

12. The simultaneous interpretation method according to claim 10, further includes performing the following operations before outputting the audio segments in the target language:
  encoding the extracted audio segments to obtain the encoded data;
  using the IEMOCAP dataset to assign the encoded data to four emotion categories, and conducting data training on each of these four emotion categories to establish a double-loop neural network model, wherein the four emotion categories include anger, happiness, sadness and neutrality; and
  applying the double-loop neural network model to the audio segments of the target language.

13. The simultaneous interpretation method according to claim 10 further includes:
  identifying the geographic location of the user to obtain the official language of the geographic location.

14. The simultaneous interpretation method according to claim 10, wherein presenting a user with a prompt on whether simultaneous interpretation is required through a user interface when it is detected that the language of a video or program is not the official language of the geographic location includes:
  presenting the user with a prompt on whether simultaneous interpretation is required through the user interface of a terminal device when it is detected that the language of the video or program watched by the user through the terminal device is not the official language of the geographic location.

15. The simultaneous interpretation method according to claim 14, wherein receiving the original audio of the video or program includes:
  receiving the original audio of the video or program from the terminal device.

16. The simultaneous interpretation method according to claim 15, wherein outputting the audio segments in the target language includes:
  sending the audio segments in the target language to the terminal device.

17. The simultaneous interpretation method according to claim 14, wherein the terminal device is a set-top box.

18. The simultaneous interpretation method according to claim 10, wherein the electronic device is pluggable.

19. A non-transitory computer-readable medium of an electronic device storing one or more instructions, that when executed by a processor, cause the electronic device to perform one or more operations comprising:
  presenting a user with a prompt on whether simultaneous interpretation is required through a user interface when it is detected that the language of a video or program is not the official language of the geographic location;
  presenting target language options to the user in response to the user's selection of the need for simultaneous interpretation, wherein the target language options include the official language;
  receiving the original audio of the video or program;
  extracting the audio segments of the original audio in real time and translating them into the target language in response to the user's selection of the target language; and
  outputting the audio segments in the target language.

20. The computer-readable medium of claim 19, wherein the one or more instructions when executed by the processor, further cause the electronic device to perform the one or more operations further comprising at least one of:
  commenting out the original audio from the video or program when it is received, to disable it;
  identifying the geographic location of the user to obtain the official language of the geographic location;
  performing the following operations before outputting the audio segments in the target language:
    encoding the extracted audio segments to obtain the encoded data;
    using the IEMOCAP dataset to assign the encoded data to four emotion categories, and conducting data training on each of these four emotion categories to establish a double-loop neural network model, wherein the four emotion categories include anger, happiness, sadness and neutrality; and
  applying the double-loop neural network model to the audio segments of the target language.

* * * * *